(12) United States Patent
Wu et al.

(10) Patent No.: US 6,741,899 B1
(45) Date of Patent: May 25, 2004

(54) SYSTEM AND METHOD FOR DESIGNING A COMPONENT

(75) Inventors: Wen Jer Wu, Ann Arbor, MI (US); Shao-Chiung Lu, Canton, MI (US); Jhun-Sou Lin, Novi, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/499,403

(22) Filed: Feb. 7, 2000

(51) Int. Cl.⁷ .............................................. G06F 19/00
(52) U.S. Cl. .......................... 700/97; 122/511; 72/369
(58) Field of Search ............................. 700/97, 98, 95, 700/96; 703/9, 1; 122/511; 72/364, 367.1, 368, 369

(56) References Cited

U.S. PATENT DOCUMENTS

| | | | |
|---|---|---|---|
| 4,195,506 A | * 4/1980 | Kawanami et al. | 72/16.5 |
| 4,649,498 A | 3/1987 | Kedem | |
| 4,947,666 A | * 8/1990 | Hametner et al. | 72/37 |
| 5,046,852 A | * 9/1991 | Hametner et al. | 356/398 |
| 5,058,544 A | * 10/1991 | Guntly et al. | 123/179.9 |
| 5,207,205 A | * 5/1993 | Mesenich | 123/533 |
| 5,260,883 A | * 11/1993 | Wilson | 703/1 |
| 5,768,149 A | * 6/1998 | Umney et al. | 703/1 |
| 5,923,573 A | * 7/1999 | Hatanaka | 703/2 |
| 5,971,026 A | 10/1999 | Beran | |

* cited by examiner

Primary Examiner—Leo Picard
Assistant Examiner—Chad Rapp
(74) Attorney, Agent, or Firm—Visteon Global Tech, Inc.

(57) ABSTRACT

A system 10 for designing an automotive component such as an air induction tube 22. A CAD system 18 receives certain programmable parameters 14 and a user selected integer value 16 by way of a user interface 12, and generates a tube design 22 having a number of curved portions which is equal to the integer value 16. Each portion the resulting tube 22 is independently programmable or modifiable, thereby providing a designer with a large degree of flexibility in altering the design and/or configuration of tube 22 without having to redesign an entirely new tube.

18 Claims, 2 Drawing Sheets

SYSTEM AND METHOD FOR DESIGNING A COMPONENT

FIELD OF THE INVENTION

This invention relates to a system and a method for designing a component and more particularly, to a system and a method which utilizes a computer aided design system to provide an automotive component design which is relatively quickly, easily and efficiently generated and/or modified.

BACKGROUND OF THE INVENTION

Computer aided design systems, commonly referred to as "CAD systems", are used to efficiently design and develop a diverse variety of components and assemblies, such as automotive components and assemblies. CAD systems typically include a computer display or terminal which operates under stored program control and which selectively allows a user to generate, view and modify the component or assembly which is to be designed and/or developed. Particularly, a user selectively enters the data which is used by the CAD system to generate the component design, and manipulates the data to alter the shape, size and/or design of the component in order to meet certain guidelines or criteria.

While computer aided design systems allow components to be relatively quickly generated and designed, they suffer from some drawbacks. For example and without limitation, when designing a component or assembly having a relatively complex shape or geometry, such as an automotive air induction tube, a user typically begins the design process "from scratch" (i.e., without using a template or platform), and programs or designs the component based upon various rules, guidelines and constraints which must be met or satisfied. The component is defined by a single set or group of equations, coordinates and/or data which describe the geometry or dimensions of the entire component. As a result, the generated component design is created to serve only one purpose, (i.e., to make a single production part) and is difficult to alter or modify. Hence, whenever an alteration or modification of a component is required, designers must begin the design process anew, rather than modifying a previously generated design. This inability to readily modify existing designs undesirably increases the time and expense required to design and develop complex objects or components, thereby decreasing the efficiency and flexibility of the design process.

There is therefore a need to provide a system for designing components which overcomes at least some of the various and previously delineated drawbacks of prior systems and methods, and which provides for the relatively simple creation and modification of component designs.

SUMMARY OF THE INVENTION

It is a first object of the invention to provide a system for designing a component which overcomes at least some of the previously delineated drawbacks of prior design systems.

It is a second object of the invention to provide a system for designing a component which allows the component to be relatively quickly and easily generated according to certain design constraints or rules.

It is a third object of the invention to provide a system for designing a component which produces a design which may be relatively easily modified or altered.

According to a first aspect of the present invention, a system for designing a tube is provided. The system includes a user interface which accepts first data corresponding to an integer value. The system further includes a computer aided design system which is communicatively coupled to the user interface, which receives the first data from the user interface, and which generates a tube design having a certain amount of curved portions, the certain amount being equal to the integer value.

According to a second aspect of the present invention, a method for generating a tube design within a computer aided design system is provided. The method includes the steps of generating a first tube portion which is defined by a first set of independently programmable parameters; generating a second tube portion which is defined by a second set of independently programmable parameters; and connecting the first and the second tube portion, thereby forming the tube design.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
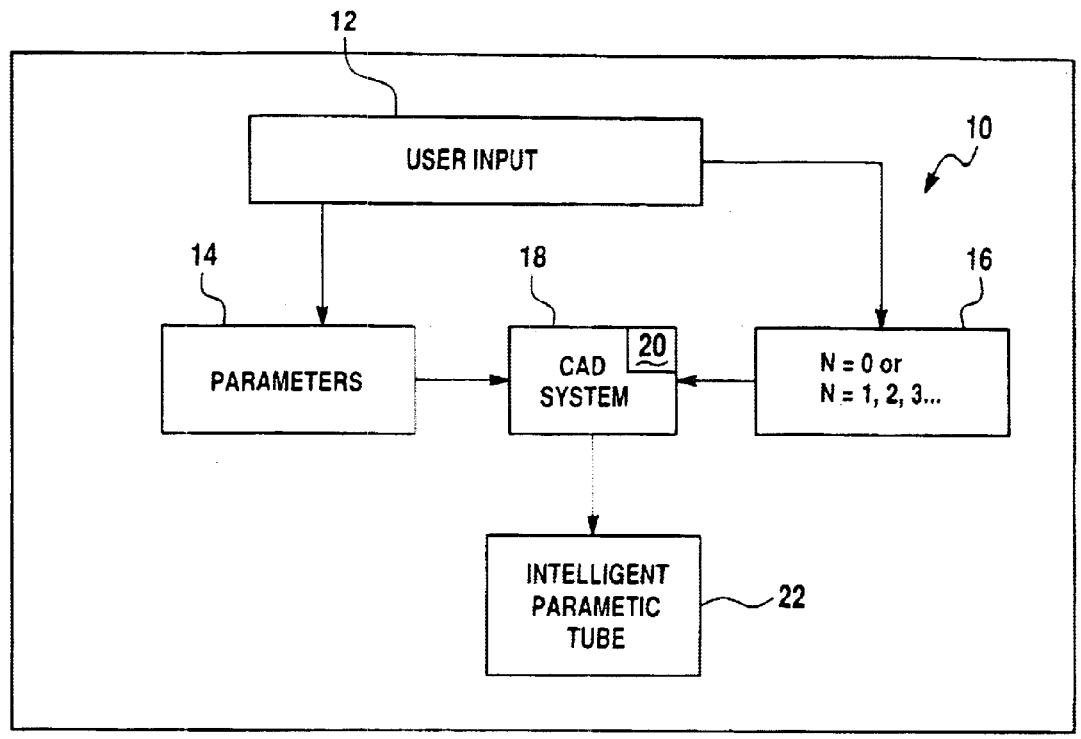
FIG. 1 is an operational flow diagram of a system for designing a component which is made in accordance with the teachings of a preferred embodiment of the present invention.

Referring now to FIG. 1, there is shown a component design system 10 which is made according to the teachings of the preferred embodiment of the present invention and which is adapted to create or generate an automotive component design such as an air induction tube design 22. In the preferred embodiment of the invention, tube design 22 corresponds to a conventional air induction tube which is typically designed in accordance with certain "mounting" and/or packaging constraints or criteria associated with the type of vehicle in which the tube is to be employed. While the use of component design system 10 is discussed in reference to the creation and/or generation of an air induction tube design 22, it should be realized that in other alternate embodiments, design system 10 can be used to design and/or generate other various components, structures or objects.

In the preferred embodiment, system 10 operates by use of a conventional computer aided design system ("CAD system")18 that includes a memory unit 20 and one or more microprocessors which cooperatively perform the below-described calculations, functions, designs and other processes. In the preferred embodiment of the invention, memory 20 is a conventional memory unit which includes both permanent and temporary memory, and which is adapted to and does store at least a portion of the operating software which directs the operation of CAD system 18. Moreover, memory 20 is adapted to selectively store other types of data or information, including information associated with the operation of the preferred embodiment of the invention, processing data, graphics data and/or operational data. As will be more fully discussed below, examples of such data include, but are not limited to, default parameter values, coordinate values, mathematical and geometric relationships and equations, constants, spatial constraints, design criteria and other data, which are used by CAD system 18 to generate a tube design 22.

CAD system 18 is communicatively coupled to and receives data from a conventional user interface or input device 12 (e.g., a keyboard, mouse, disk drive, modem or other data inputting apparatus). In the preferred embodiment, CAD system 18 receives certain programmable parameters or variable values 14 and a user selected integer value ("N")16. The programmable parameters or variable values control and/or determine the shape and size of the tube and may be based upon packaging constraints and other design criteria. Parameters or variables 14 may be selectively entered or modified by a user through interface 12, or may be set to certain default values that are stored within memory 20. Integer value 16 corresponds to the number or amount of bends, curves, or curved portions which is desired or necessary within tube design 22. That is, as explained more fully below, CAD system 18 receives integer value 16 and generates a tube 22 having a number or an amount of bends which is equal to integer value 16.

Figure 2:
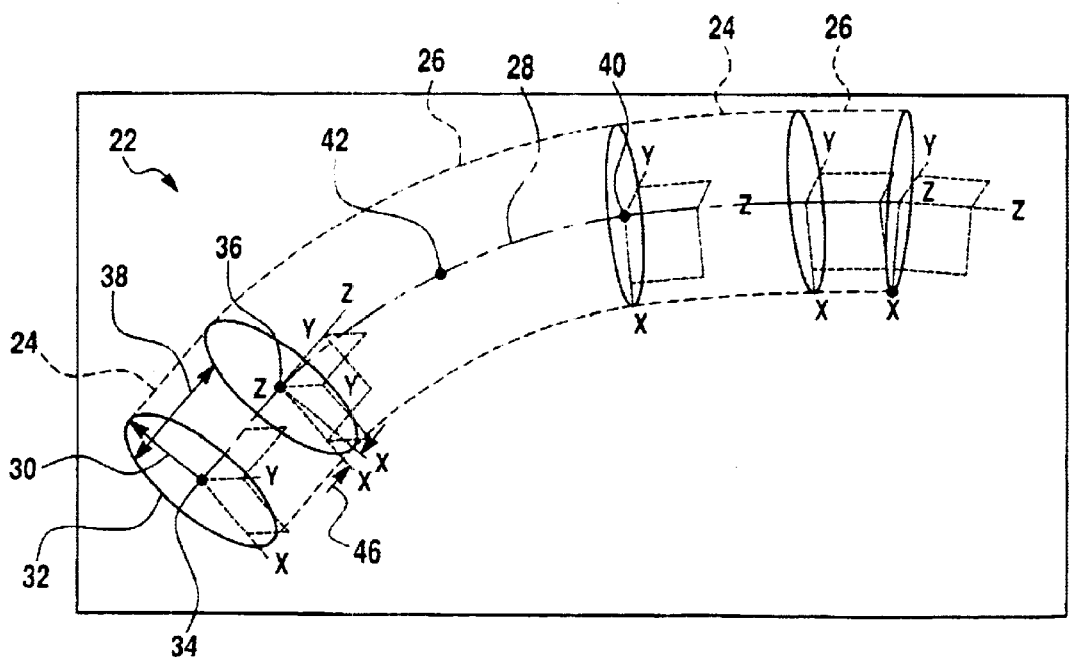
FIG. 2 is a first example of a tube design which is generated by the system shown in FIG. 1.
Figure 3:
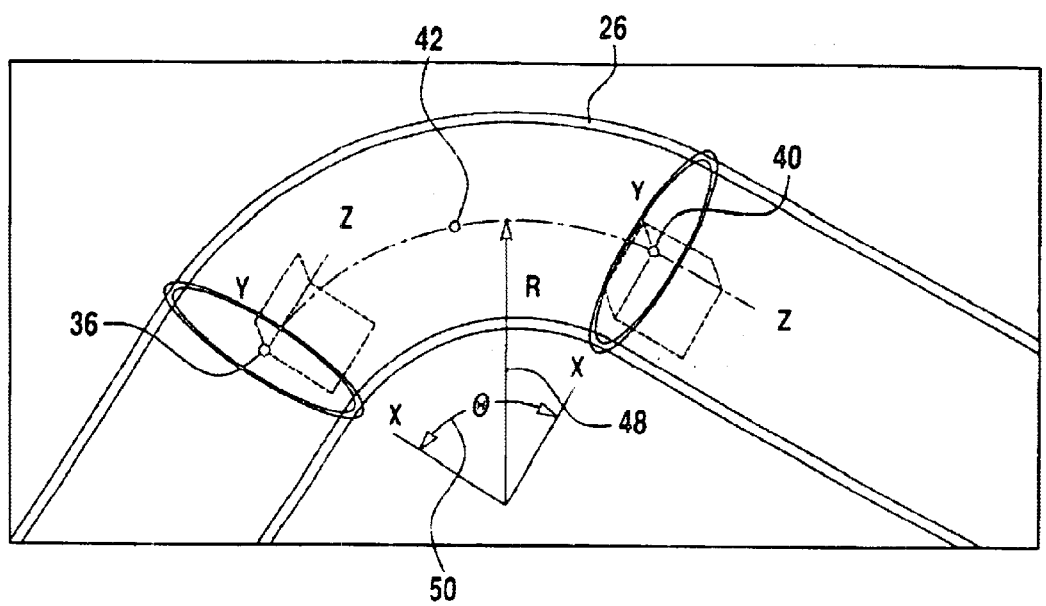
FIG. 3 is a curved portion of the tube design illustrated in FIG. 2.

In order to more fully understand the operation of system 10 the following discussion will describe the method or procedure used by system 10 to create a tube design 22. Referring now to FIGS. 2 and 3, system 10 creates tube design 22 using several independently programmable and/or modifiable "building blocks", segments, modules or portions 24, 26 which are linked or joined together in a cooperative manner to form tube design 22. As explained more fully and completely below, the "modular" and parametric method of generating tube design 22 (e.g., by use of several independently modifiable portions) allows the generated tube design 22 to be relatively easily and efficiently manipulated and modified to meet various design criteria and packaging constraints.

In the preferred embodiment of the invention, each section or portion 24 represents a "straight" portion of tube 22, and each section or portion 26 represents a bend or a "curved" portion of tube 22. It should be appreciated that by connecting several straight portions 24 and curved portions 26, a tube of virtually any shape and size may be formed.

In the preferred embodiment, the tube 22 is formed or designed in relation to a center line or axis 28 and has a generally circular outer perimeter or surface 32 which has a tube radius 30 which is measured from center line 28 and which may vary over the length of tube 22. Each segment which is created by system 10 is formed between a first or "start" point or coordinate through which line 28 passes (e.g., point 34) and a second or "end" point or coordinate through which line 28 passes (e.g., point 36).

Straight sections or portions 24 of tube 22 are created by forming a straight segment of axis 28 between the two points (e.g., between points 34 and 36). When forming a straight portion 24, the coordinates of the second or end point (e.g., point 36) are determined by the desired length of the portion 24, which may be selectively entered as one of parameters 14 by a user or designer. For example and without limitation, if a designer desires a straight segment 24 having a length 38, the user need only enter a "tube length" parameter or value representing the desired length 38. Upon receipt of the "tube length" parameter or value, CAD system 18 generates tube portion 24 from point 34 to point 36. Particularly, CAD system 18 uses the coordinates of point 34 ($x_1$, $y_1$, $z_1$) and adds a $\Delta z$ value which corresponds to the desired length 38 of portion 24. The resulting coordinates of point 36 are thus ($x_1$, $y_1$, $z_1+\Delta z$). Center line or axis 28 is then formed as a straight segment connecting the two points 34 and 36.

Each time a new segment or portion is added to tube design 22, CAD system 18 redefines or reinitializes the coordinate system (i.e., the "x", "y", and "z" axes) in reference to the current or present starting point (e.g., point 36). Curved portions 26 of tube 22 are created by forming an arc or a curved segment of axis 28 between a "start" point (e.g., point 36), an "end" point (e.g., point 42), and a "reference" point (e.g., point 40) which is located between the "start" point and "end" point. In the preferred embodiment, a bend or curved portion 26 of tube design 22 is defined by three parameters, a bending rotation angle "$\phi$" (e.g., angle 46) which is defined with respect to the "z"-axis, a bending radius "R" (e.g., radius 48), and a bending angle "$\theta$" (e.g., angle 50). These parameters can be selectively entered by a user and CAD system 18 will use the entered parameters to generate the desired bend or curved portion 26. In one non-limiting embodiment, CAD system 18 generates the curved portion 26 in the following manner.

CAD system 18 receives or accepts the selectively entered parameter values or retrieves stored or default values from within memory 20. CAD system 18 first rotates the coordinate system by the bending rotation angle $\phi$ (e.g., angle 46) and reinitializes the coordinate system. CAD system 18 then assigns coordinates (e.g., $x_2$, $y_2$, $Z_2$) to beginning point 36 according to the new coordinate system, and determines the coordinates of the reference point 42 and end point 40 relative to point 36. Particularly, the coordinates for end point 40 are set equal to ($x_2+R^*$ (1−cos $\theta$), $y_2$, $z_2+R^*$ sin $\theta$), and the coordinates for reference point 42 are set equal to ($x_2+R^*$ (1−cos $\theta/2$), $Y_2$, $Z_2+R^*$sin $\theta/2$). Center line or axis 28 is then formed as an arc connecting the three points 36, 42 and 40. It should be appreciated that in other embodiments, portions 24 and 26 may be formed using any other suitable method, algorithm or process.

In operation, a user determines the number of bends or curved portions 26 that are desired or necessary within the tube design 22 and enters this value (i.e., integer value 16) by use of user interface 12. At this initial stage, a user may also input one or more of parameters 14 (e.g., tube radius values or tube radii, bending radii, bending angles, rotational angles, segment lengths or other values) which are used by CAD system 18 to generate tube design 22. If no parameters are entered, CAD system 18 retrieves default parameter values which are stored within memory unit 20 and generates tube design 22 by use of these default values and the integer value 16. Particularly, CAD system 18 will generate a tube design 22 having a number of bends or curved portions 26 which is equal to integer value 16. In the preferred embodiment, CAD system 18 inserts or generates a straight tube portion or segment 24 between each bend or curved portion 26 and links or connects all of the bends 26 and straight portions 24, thereby and forming tube design 22. In this manner, a tube having a relatively complex geometric configuration can be quickly generated and easily modified to fit a designer's needs.

Figure 4:
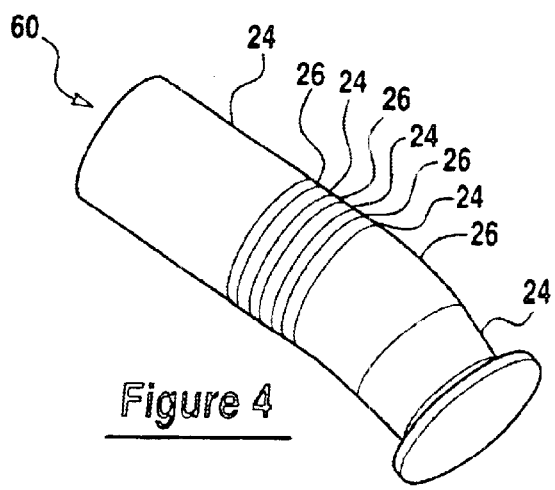
FIG. 4 is a second example of a tube design which is generated by the system shown in FIG. 1.
Figure 5:
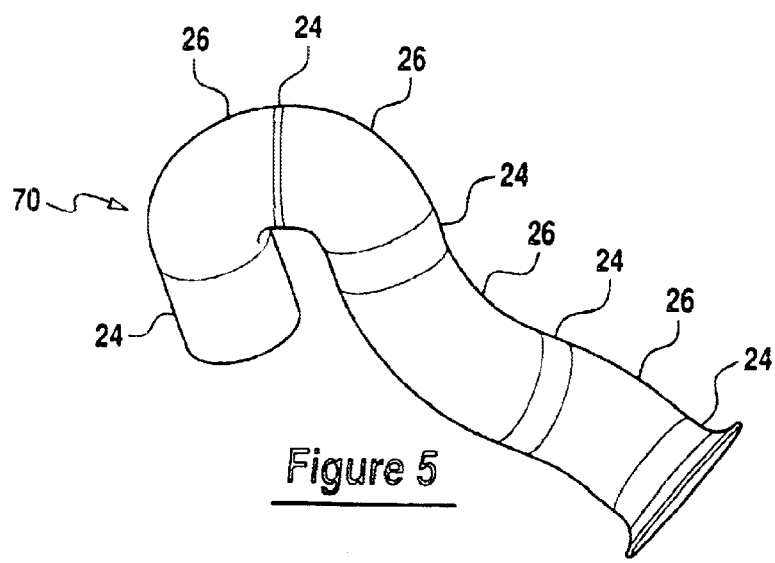
FIG. 5 is a .third example of a tube design which is generated by the system shown in FIG. 1.

Particularly, once tube design 22 has been formed, a user or designer can manipulate and/or modify the tube design 22 in a relatively simple manner. That is, a user or designer can modify the tube design 22 by selecting any one or more of the independently modifiable or programmable segments 24, 26, and then entering or modifying the sets of parameters which define the selected segment(s) 24, 26. One example of a default tube design 60 is illustrated in FIG. 4. By selecting the various segments 24, 26 and modifying the sets of parameters which define segments 24, 26, a modified tube design 70, which is illustrated in FIG. 5, is relatively quickly and easily generated.

System 10 allows a designer to modify a tube design 22 in a "modular" manner (e.g., on a segment by segment basis), and thereby provides the designer with a large degree of flexibility to explore various designs and configurations without having to redesign an entirely new tube. The independently programmable or modifiable portions 24, 26 of tube design 22 are especially important in situations where only a portion of a current existing design needs to be modified. For example and without limitation, if a tube is designed according to certain vehicle packaging constraints which are partially altered or modified in a subsequent vehicle model, a designer can use the previous tube design and alter or modify only those segments of the tube which are effected by the alteration. In this manner, system 10 provides a tube design 22 which is generated and modified in a relatively quick, simple and efficient manner.

It is to be understood that the present invention is not limited to the exact construction or method which has been previously delineated, but that various changes and modifications may be made without departing from the spirit and scope of the invention as are more fully delineated in the following claims.

What is claimed is:

1. A system for designing a tube, said system comprising:
    a user interface which accepts first data corresponding to an integer value and which is effective to accept second data; and
    a computer aided design system which is communicatively coupled to said user interface, which receives said first data from said user interface, and which generates a tube design having a certain amount of curved portions, said certain amount being equal to said integer value, said computer aided design system is effective to generate said certain amount of curved portions based upon said second data;
    wherein said second data comprises at least one set of parameters which corresponds to a unique one of said certain amount of curved portions, and wherein a modification to said at least one set of parameters only effects said unique one of said certain amount of curved portions.

2. The system of claim 1 wherein said at least one set of parameters comprises an angle of rotation corresponding to an unique one of said certain amount of curved portions.

3. The system of claim 2 wherein said at least one set of parameters comprises a bending radius corresponding to a unique one of said certain amount of curved portions.

4. The system of claim 3 wherein said at least one set of parameters comprises a bending angle corresponding to a unique one of said certain amount of curved portions.

5. The system of claim 1 wherein said computer aided design system generates said tube design based upon certain default data stored within said computer aided design system.

6. A system for creating a tube design having a first tube portion and a second tube portion, said system comprising:
    a first portion which stores a first plurality of parameters which cooperatively define said first tube portion;
    a second portion which stores a second plurality of parameters which cooperatively define said second tube portion; and
    a user interface which is communicatively coupled to said first portion and said second portion and which allows a user to input said first plurality of parameters and said second plurality of parameters, thereby creating said tube design, wherein said first plurality of parameters only defines and effects said first tube portion and wherein said second plurality of parameters only defines and effects said second tube portion.

7. The system of claim 6 wherein said first tube portion is integrally formed with said second tube portion.

8. The system of claim 6 wherein first tube portion comprises a curved portion.

9. The system of claim 8 wherein said second tube portion comprises a straight portion.

10. The system of claim 9 wherein said first plurality of parameters comprises a bending angle.

11. The system of claim 10 wherein said first plurality of parameters further comprises a bending radius.

12. The system of claim 11 wherein said first plurality of parameters further comprises a bending rotation angle.

13. The system of claim 6 wherein said tube is an air induction tube.

14. A method for generating a tube design within a computer aided design system, said method comprising the steps of:
    generating a first tube portion which is defined by a first set of independently programmable parameters, wherein a change in said first set of independent programmable parameters only effects said first tube portion;
    generating a second tube portion which is defined by a second set of independently programmable parameters, wherein a change in said second set of independent programmable parameters only effects said second tube portion; and
    connecting said first and said second portion, thereby forming said tube design.

15. The method of claim 14 wherein said first tube portion comprises a straight portion of said tube design.

16. The method of claim 15 wherein said second tube portion comprises a curved portion of said tube design.

17. The method of claim 16 wherein said second set of independently programmable parameters comprises a bending radius and a bending angle.

18. The method of claim 17 wherein said second set of independently programmable parameters comprises a bending rotation angle.

* * * * *